April 13, 1965    A. F. ANDERSON    3,177,964
HYDROSTATIC DRIVE

Filed Jan. 29, 1962    3 Sheets-Sheet 1

Fig. 1.

INVENTOR.
Arthur F. Anderson.
BY
Harness, Dickey & Pierce
ATTORNEYS

United States Patent Office 3,177,964
Patented Apr. 13, 1965

3,177,964
HYDROSTATIC DRIVE
Arthur F. Anderson, Livonia, Mich., assignor to Gar Wood Industries, Inc., Wayne, Mich., a corporation of Michigan
Filed Jan. 29, 1962, Ser. No. 167,691
23 Claims. (Cl. 180—66)

The present invention relates generally to hydrostatic drives and more particularly to a novel automatic control system for such drives.

As will be appreciated, hydrostatic drive systems usually comprise a power source, a fluid pump driven thereby, and a plurality of motors powered by the fluid from the pump. One application of these systems is for the powering of various types of land vehicles, where the pump is driven by an ordinary internal-combustion engine and an individual fluid motor is provided for each wheel, or for at least two wheels. There are, of course, other applications of hydrostatic drive systems, such as those for powering the rolls in a rolling mill, the propellers of a boat, the various feeds of a machine tool, and so on; however, for purposes of description the present invention will be described embodied in an exemplary hydraulic system for the powering of land vehicles.

In this embodiment, the invention operates to prevent the loss of system pressure necessary to drive all the powered wheels which would occur when one of the wheels loses traction and begins to spin in an uncontrolled fashion, by limiting the maximum amount of torque which is applied to each wheel to an amount no greater than that which it can transmit to the ground for driving without losing traction. Such a loss of traction might tend to occur, for example, if that wheel suddenly encounters a slippery spot on the ground when under power or if it suddenly loses contact with the ground because of a depression therein, especially likely in a rigid suspension vehicle; and in any case, if such loss of traction occurs and the associated motor is subject to system pressure it will start to spin excessively in an uncontrolled fashion and thus dissipate the pressure in the system, disabling all the remaining powered wheels of the vehicle. A similar situation exists if the vehicle is provided with a hydraulic braking system, whereby braking is achieved by stopping flow from the pump and using a relief valve to maintain a high pressure in the system against which the motors must pump in order to continue rotation. Thus, if while the vehicle is being hydraulically braked one wheel encounters a slippery spot or otherwise tends to lose traction, the pressure in the system generated by the other motors acting as pumps will tend to excessively spin the slipping wheel in the opposite direction, in the absence of an anti-spin device, with the result that system pressure is dissipated and braking is impossible on any wheel. In all such applications, therefore, the apparatus of the present invention operates to individually control the amount of torque generated by each driving motor when either braking, decelerating, cruising or accelerating to insure that it does not exceed the maximum amount of torque each individual wheel can tolerate without losing traction.

Although there are a number of different types of hydrostatic drives, the present invention is directed to a highly efficient type hydrostatic drive system utilizing a single variable displacement pump, a plurality of variable displacement motors powered thereby, and servo or compensating means in conjunction with each motor for regulating the displacement thereof in direct response to the load thereon, whereby there exists between the pump and each motor an automatic hydraulic transmission which is infinitely variable to optimize the torque and speed of the motor under varying load conditions within the tractive range of the associated wheel. Another type of system which also may be used comprises a separate variable displacement pump for each motor. In this system a loss-of-traction or no-load condition on one motor is not particularly critical to the whole system, since there is no common system pressure for all motors which may be lost. However, the present invention may be adapted for use in such a system to advantage to provide the maximum amount of power to each wheel without there occurring a loss of traction, thus preventing the unnecessary waste of power otherwise required to spin the wheel.

In the past several techniques have been tried in order to automatically prevent the uncontrolled pressure-dissipating spin of one motor in a common system; however, all have suffered serious disadvantages. For example, one technique has been to provide a pilot-operated diverter valve for each motor which is responsive to the inlet pressure thereof to remove the motor from the circuit after spinning occurs and the pressure drops. However, such systems are not satisfactory since they must either have a certain predetermined inlet pressure below which the diverter valve will be actuated or there must be provided a differential analyzer for comparing the inlet pressure to a given motor with the inlet pressures to each of the other motors in the system to determine when a motor inlet pressure decreases to a point with respect to the other motors which indicates that it is spinning. The primary disadvantage of a differential analyzer system is that it is extremely complicated and very expensive, as can be imagined. Systems using a predetermined cut-off pressure are also not satisfactory, since the inlet pressure to a given motor does not truly represent the load thereon, and since the break-away torque which will spin a wheel is not the same for each wheel and is not constant for a given wheel. By way of illustration, if a given wheel of a vehicle is very heavily weight-loaded, it will take a much greater inlet pressure and hence torque to spin that wheel on a given surface than it will if the vehicle is lightly loaded over that wheel. Thus, a system responsive to inlet pressure is not compensated for the fact that in normal use a given wheel will be subject to varying amounts of weight, and therefore will sometimes operate to remove a given motor from the system circuit simply because the load carried by that wheel is relatively small, even though the wheel is not spinning. Another disadvantage of motor inlet pressure-responsive diverter valves is that they do not prevent wasteful spinning but simply try to restore the system to normal after it has occurred. Also, such systems often have great difficulty in starting the vehicle or restarting one wheel after it has spun out, because under those conditions, the pressure at the motor is low and there is no way to increase it to take the diverter valve out of operation.

Another technique involves the use of electrical speed-sensing devices at each wheel and an electronic differential analyzer to determine which, if any, wheel is spinning but these are extremely expensive and complicated, as well as difficult to maintain. Yet another technique involves the addition to the circuit of a metering pump for each motor inlet line so that equal volumes of fluid are delivered to each of the motors. The disadvantage here is again that spinning is not prevented, and further that the entire flow to a wheel which has lost traction is lost to the system for use in propelling the other motors, whereby there is an excessive power loss in the system, in the order of 25% in a four-motor system. Such a system is also quite expensive, since each of the metering pumps will usually cost about as much as the motors themselves. Another technique is to put all the motors in series with each other and the pump; however, such a system is extremely inefficient because of the extreme pressure drops across each pump, which results in a tremendous loss in the potential amount of torque which may be developed to drive the vehicle.

It is, therefore, a primary object of the present invention to provide a novel, relatively simple and inexpensive anti-spin apparatus for hydrostatic vehicle drive systems which avoids all the aforementioned disadvantages of the above-discussed presently known devices by continually sensing the actual torque load and/or weight on one or more driven vehicle wheels and by controlling the displacement of the associated motor in response to the actual load conditions sensed to substantially prevent the motor from exerting a torque on the wheel which will cause it to lose traction and spin, whereby there is prevented a pressure dissipating flow of system fluid through the motor which would otherwise occur if the wheel were allowed to spin in an uncontrolled fashion.

Another object resides in the provision of a novel hydrostatic vehicle drive system which incorporates all the advantages of an infinitely variable hydraulic transmission between the pump and each motor by utilizing variable displacement motors, and which further controls each motor to prevent it from applying an excessive amount of torque to its wheel, such as might cause the wheel to spin in an uncontrolled fashion and dissipate system pressure essential to the powering of the remaining motors.

A further object concerns the provision of a hydrostatic vehicle drive system including a variable displacement pump, a plurality of variable displacement motors powered thereby, and ground-engaging wheels individually driven by the motors, wherein means are provided for sensing the actual weight on each driven wheel to thereby reduce the maximum amount of torque its motor may deliver to it as the weight thereon decreases, and vice versa.

A further object resides in the provision of an anti-spin apparatus which may be manufactured in a wholly self-contained and independent unit adapted to be mounted in an assembly with the motor it is to control, completely independent of the other motors, anti-spin devices and pump insofar as hydraulic lines are concerned.

These and other objects of the present invention will become apparent from consideration of the specification taken in conjunction with the accompanying drawings in which there is illustrated an embodiment of the present invention, and wherein.

Figure 1:
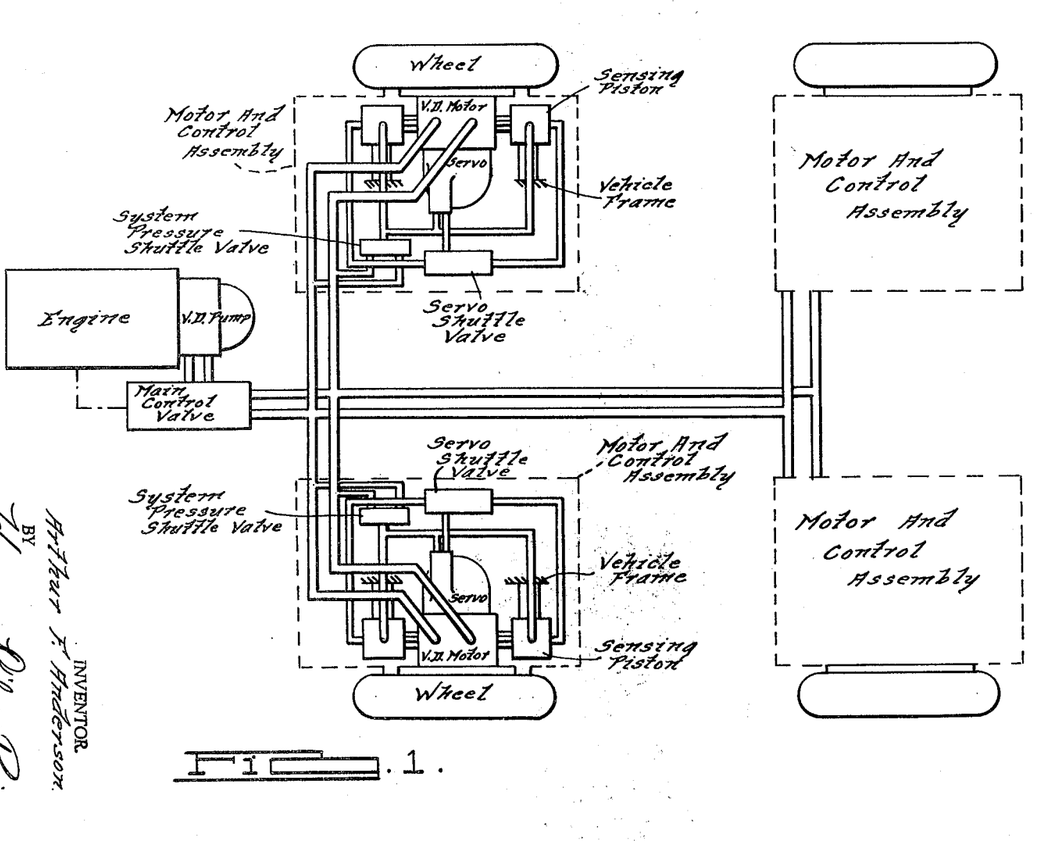
FIGURE 1 illustrates schematically a hydrostatic drive for vehicles utilizing anti-spin apparatus incorporating the principles of the present invention.

As can be seen in FIGURE 1, the hydrostatic drive system comprises an engine, a variable displacement fluid pump driven directly thereby, a main control valve for controlling the overall operation of the system, a plurality of powered wheels, an independent motor-and-control assembly associated with each wheel, and fluid lines connecting the main control valve with each of the motor-and-control assemblies in a parallel circuit. As can be seen, only two fluid lines need to extend to each motor-and-control assembly, namely a supply line and a return line. A given line will act as a supply line for driving the wheels in one direction of rotation and as a return line for driving the wheels in the opposite direction of rotation, so that a minimum number of hydraulic lines need extend through the vehicle to each of the motor-and-control assemblies.

The main control valve contains all the components necessary to control the general operation of the vehicle, such as acceleration controls for controlling engine speed and pump displacement, a main system relief valve, brake controls or valves, and so on, all of which do not form a part of the present invention. One pump ideally suited for the present application is the variable displacement piston pump disclosed in my copending application Serial No. 71,033.

Each of the motor-and-control assemblies, which may be integrated interchangeable cartridge units, comprises a pair of sensing piston assemblies rigidly supported upon the vehicle frame, a variable displacement fluid motor supported by the sensing piston assemblies and in turn supporting and driving a wheel, a servo unit for controlling the displacement and hence operation of the motor, a system pressure shuttle valve for providing system supply pressure to each of the sensing pistons and the servo unit, and a servo shuttle valve for communicating fluid to the servo unit from each of the sensing piston assemblies, specifically from the one in which is present the highest pressure, all as will become more apparent hereinbelow. As will be appreciated, the vehicle may be provided with any number of ground-engaging wheels, and any number of the wheels provided may be motorized, depending upon the particular vehicle and application contemplated.

Figure 2:
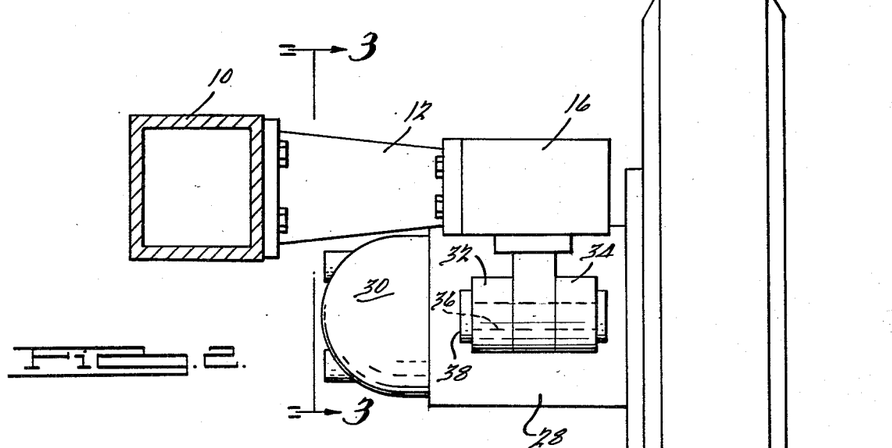
FIGURE 2 is a diagrammatic view of a fluid motor and anti-spin apparatus assembly at one wheel of the vehicle, looking along a line parallel to the longitudinal axis of the vehicle.
Figure 3:
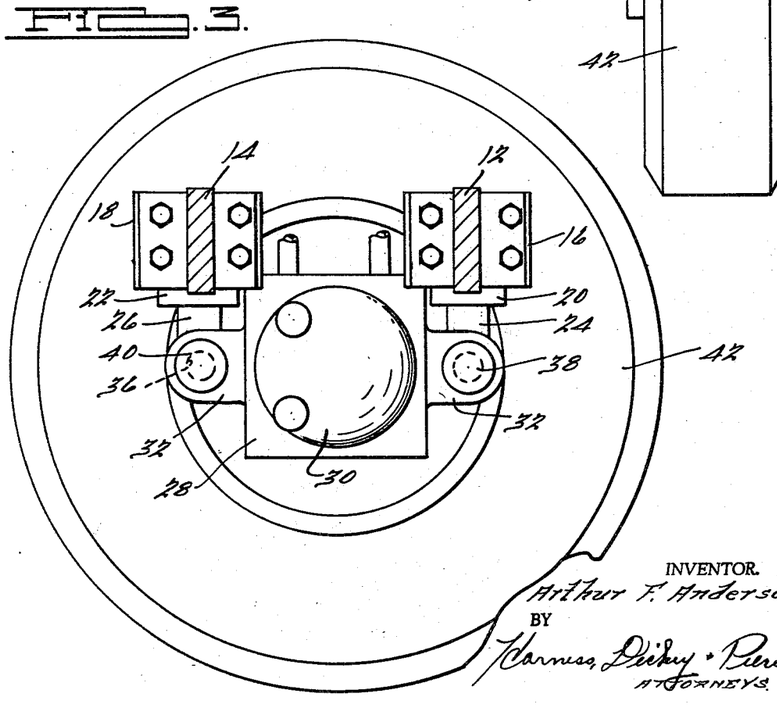
FIGURE 3 is a sectional view looking along line 3—3 in FIGURE 2.

One way in which the motor-and-control assembly may be mounted to a vehicle is illustrated in FIGURES 2 and 3. As shown, a portion of the vehicle frame 10 is provided with a pair of mounting brackets 12 and 14 to the outer ends of which are rigidly secured sensing piston cylinder housings 16 and 18, respectively. Housings 16 and 18 are provided with suitable cylinder bores, not shown in these figures, in which are slidably positioned sensing pistons 20 and 22, respectively, the lower ends of which are illustrated projecting from the housings and are provided with apertured connecting rods 24 and 26, respectively. The fluid motor, indicated at 28, is provided on the inside end thereof with a servo housing 30 and on each side thereof with a pair of ears 32 and 34, each pair being provided with aligned apertures 36. Motor 28 may be of the same construction as the pump described in my above-mentioned copending application. Connecting rods 24 and 26 are positioned between each of the pairs of ears on the motor housing and are pivotally secured thereto by means of suitable pin assemblies 38 and 40. In the at-rest position of the vericle, the axes of each of the pivotal connections between the connecting rods and the motor housing, and the axis of rotation of the motor drive shaft and wheel will lie in a common horizontal plane. The wheel, indicated at 42, is rotatably secured to the outwardly facing end of motor housing 28 in any suitable manner and is driven directly by the drive shaft of the motor (not shown) which extends into the hub thereof. A suitable reduction gear arrangement may be utilized between the motor drive shaft and wheel hub if desired.

Although the disclosed embodiment is a rigid suspension arrangement, it will be appreciated that a spring suspension may be used so long as the sensing pistons are positioned so as to be responsive to the torque and weight upon that wheel of the vehicle. Steering likewise may be accomplished in any desired manner, such as by utilizing a turning axle having wheels at each end, or by providing a suitable kingpin or equivalent pivotal arrangement between housings 16 and 18 and frame 10. As will be apparent, the system pressure and servo shuttle valves, and the remaining circuitry constituting a motor-and-control assembly may be formed integrally as a part of servo housing 30, so that the entire assembly would appear as shown in FIGURES 2 and 3. Such an assembly would be extremely compact and could be easily removed and replaced when desired.

Before getting into the details of construction of the present embodiment, it might be helpful to consider broadly how the present invention operates. In the past, hydrostatic drive circuits have been devised which utilize a plurality of variable displacement motors in conjunction with a single variable displacement pump. Such systems have incorporated compensating or servo mechanisms associated with each motor which are responsive to the inlet pressure of its motor to vary its displacemnt in such a way as to optimize speed and torque under varying loads as represented in the form of inlet pressure. Such systems have, in essence, an infinitely variable hydraulic transmission between the pump and each motor. The system of the present invention is generally similar to systems of this type; however, the present system differs significantly therefrom in that it is provided with servos for sensing the *actual* torque and weight on each individual wheel of the vehicle and regulating the displacement of the associated motor in accordance therwith. Thus, the system of the present invention controls its individual motor in response to the *actual* loads and forces on each individual wheel. Accordingly, since, for a given coefficient of friction between the wheel and the ground, the break-away torque will be proportional to the weight on that wheel, the present system will provide, in addition to an optimizing hydraulic transmission between the pump and each motor, a further control for preventing application of too much torque to a wheel.

Thus, the system prevents spinning of one or more of the wheels when they encounter a surface having a coefficient of friction less than that of the surfaces engaged by certain of the remaining wheels. By increasing the distance between the axes of pivot pins 38 and 40, the influence of torque on the control of the pump may be decreased relative to the influence of weight, and vice versa. The system will not prevent spinning if the coefficient of friction of the surface engaged by the wheel is so low that the torque delivered by the motor in response to the influence of weight alone will cause spinning, but in such low friction conditions the rate of spin will be reduced. When no weight forces are present, such as when a wheel does not engage the surface because of a depression therein, motor displacement will automatically be reduced to zero and no spinning will occur.

Figure 4:
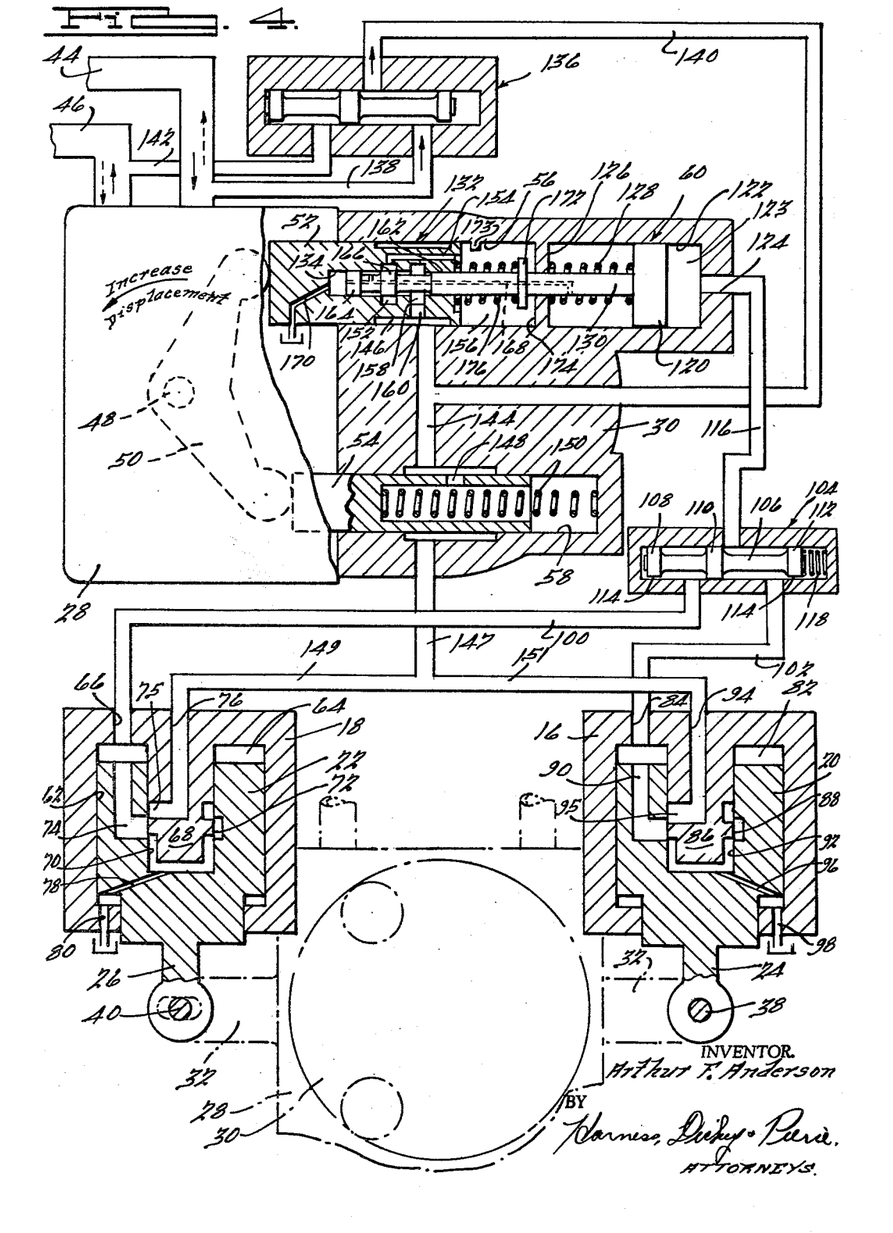
FIGURE 4 is a circuit diagram illustrating schematically the details of construction of one embodiment of the present invention.

All the components and circuitry constituting one of the motor-and-control assemblies indicated in dotted lines in FIGURE 1 are illustrated schematically in FIGURE 4. The only communication between a motor-and-control assembly and the remainder of the drive system is through supply and return lines 44 and 46 which communicate directly with the main inlet and outlet ports of motor housing 28. Considering in greater detail the circuitry, the motor within housing 28 is illustrated for exemplary purposes as a variable displacement piston motor having a conventional tilt box which may be tilted to various angular positions to vary the displacement of the motor. In the disclosed motor, the tilt box is tilted about an axis indicated at 48 by means of a double-action actuating arm 50 which is adapted to be moved from a zero displacement position by a piston 52 in a counterclockwise direction to increase displacement and by means of a piston 54 in the clockwise direction to decrease displacement. Arm 50 is illustrated in a relatively small displacement position for purposes of discussion, as will become apparent later. Piston 52 is slidably positioned within a bore 56 in servo housing 30, and piston 54 is slidably disposed within a bore 58 in the same housing, both of these pistons generally constituting a power-assist servo for directly regulating the displacement of the motor in a manner to be described. Also disposed within housing 30, coaxial with piston 52, is a control unit indicated generally at 60, the details of which will be described hereinbelow.

The details of construction of the sensing pistons will now be described. As can be seen, housing 18 is provided with a cylinder bore 62 in which sensing piston 22 is adapted to slide. The upper end of bore 62 is closed to define a sensing chamber 64 between the top of the piston and the housing, and is provided with a passageway 66 communicating with the sensing chamber. Housing 18 also is provided with a downwardly extending valve member 68 which is slidably received within a valve surface defining bore 70 axially positioned within piston 22. Valve member 68 is provided with an annular land 72 adapted to register with a passageway 74 in the piston extending between sensing chamber 64 and surface 70. As will become apparent, land 72 and passageway 74 co-operate to function as an open center valve in principle; accordingly, land 72 is shown in an exaggerated manner to be slightly smaller than passageway 74, even though in actual practice it would probably be the same size or very slightly larger, relying on leakage for operation. Immediately above land 72, valve member 68 is provided with an annular groove 75 communicating with a passageway 76 extending to the outside of the housing. The lower end of the chamber defined by valve surface 70 communicates through a passageway 78 with the chamber defined at the bottom of bore 62, which in turn communicates with a tank through a passageway 80.

Housing 16 for the other sensing piston 20 is constructed in the exact same manner, having a sensing chamber 82, a passageway 84 communicating therewith through housing 16, a valve member 86, a land 88 thereon adapted to block a passageway 90 extending through the piston from sensing chamber 82 to its valving surface 92, a passageway 94 extending through the housing from an annular groove 95 positioned immediately above land 88, and passageways 96 and 98 communicating with the lower ends of the bore within the piston and the cylinder bore with the tank.

As will be appreciated, since pistons 20 and 22 are disposed between the vehicle frame and wheel in a substantially vertical position, the axial forces thereon will directly represent the summation of the torque and weight forces upon the wheel supported thereby. For example, if it is assumed that the sensing piston assemblies illustrated in FIGURES 3 and 4 are views looking from inside the vehicle at the right front wheel thereof, the following reaction forces will be exerted against the pistons under different conditions. If the wheel is accelerating under power in the forward direction, there will be a downward force on piston 20 and an upward force on piston 22 due to the accelerating torque. On the other hand, if the vehicle is decelerating or braking, there will be an upward force on piston 20 and a downward force on piston 22 representing the braking torque. In both situations, the weight of the vehicle will be represented by an upward force on both pistons, which force will truly represent the vertical force by which the wheel is held against the ground for traction since if the wheel encounters a high spot on the ground the force will increase (especially in rigid suspension vehicles), or if it encounters a low spot, the force will decrease or even change direction to a downward force.

These forces on the two sensing pistons are in turn represented by the fluid pressures within sensing chambers 64 and 82. Passageways 66 and 84 communicating with these chambers are connected by means of lines 100 and 102, respectively, to the servo shuttle valve, indicated generally at 104. This shuttle valve is of conventional construction having a spool 106 therein provided with three spaced lands 108, 110 and 112. Lands 108 and 112 are each provided with a flat portion 114 so that whichever of lines 100 and 102 has the greater pressure will cause the spool to move to a position in which that line is in communication with an outlet line 116 from the valve. A weak spring 118 may be provided to prevent land 110 from blocking communication with line 116 when the pressures in lines 100 and 102 are substantially equal. Line 116 in turn communicates with control unit 60 positioned within servo housing 30.

Control unit 60 comprises a piston 120 slidably positioned within a bore 122, thus defining a chamber 123 within the housing communicating through a passage 124 with line 116. The inner end of bore 122 is defined by a surface 126 and a spring 128 is provided between surface 126 and piston 120 to urge the latter in a direction opposite the direction it will be urged by pressure in chamber 123. Also positioned within bore 122 and adapted to be actuated at one end by piston 120 is a spool 130 which is so constructed at its opposite end as to define a valve, generally indicated at 132, within an axial bore 134 within piston 52. It is the general purpose of control unit 60 to stroke the pump and thus vary its displacement in response to the actual torques and weight forces sensed by the sensing pistons and communicated in the form of pressure through servo shuttle valve 104 into chamber 123.

Since system pressure is utilized in the control of the motor in this embodiment, there is provided a system pressure shuttle valve, indicated generally at 136, for making available system pressure from the one of lines 44 and 46 which is the supply line for the direction of movement of the vehicle at any given time. Shuttle valve 136 is identical in construction to shuttle valve 104 except that it need not be provided with a spring since the pressure in lines 44 and 46 will never be equal at a time when its use is required. Thus, if the system fluid under supply pressure is in line 44, it will pass through a line 138 to move the spool to the left as shown, whereupon it alone may pass into a system-pressure line 140. If the vehicle is being driven in the opposite direction, line 46 will have the supply fluid and it will pass through a line 142 into the shuttle valve to move the spool therein to the right, as seen in FIGURE 4, whereupon it alone will flow into system-pressure line 140. Thus, in any case, system-pressure line 140 will not be in communication with the system return line from the motor. System-pressure line 140 extends from shuttle valve 136 into servo housing 30 wherein it communicates with a passageway 144 therein, which in turn communicates at one end with a wide annular groove 146 on piston 52 and at the other end through a port 148 in piston 54 with bore 58 and with a line 147, which in turn is connected by means of lines 149 and 151 to passageways 76 and 94, respectively, in sensing piston housings 18 and 16. As a result, annular groove 146 and passageways 76 and 94 are always provided with fluid at system pressure, and piston 54 is always being urged to the left, i.e., to decrease the displacement of the motor, by the presence of fluid under system pressure within bore 58. In addition, piston 54 is also under the influence of a relatively weak positioning spring 150 disposed between the piston and the end of bore 58 to urge the piston in the same direction as system pressure.

The details of construction of valve 132 within piston 52 will now be described. Bore 134 is provided with a first annular groove 152 communicating through a passageway 154 with a chamber 156 defined by the end of bore 56 and the inside surface of piston 52, and a second annular groove 158 communicating through a passageway 160 with outside annular groove 146 in which system pressure is always present. The valve end of spool 130 is provided with three equal diameter lands, including sealing lands 162 and 164, and a valve land 166 adapted to control the flow of fluid under system pressure to chamber 156 from passageway 160 through groove 152 and passageway 154. Spool 130 is also provided with a passageway 168 therein which communicates with bore 122 of the control unit between surface 126 and piston 120, bore 134 between lands 164 and 166, and the end of bore 134. The latter in turn communicates with the tank by means of a passageway 170 in the end of piston 52. Spool 130 is also provided with a fixed collar 172 adapted to engage surface 174 defining the bottom end of bore 56 in order to limit maximum movement of the spool to the right as seen in FIGURE 4. Collar 172 will engage surface 174 when the motor is in a zero displacement position. Collar 172 also provides support for a relatively weak positioning spring 176 positioned between it and the inside surface of piston 52. A stop 173 is provided in bore 56 to limit movement of the piston to the right, in which limit position the motor will be in a zero displacement position. As can be seen, spring 128 is provided to oppose movement to the left of piston 120, and springs 176 and 150 are simply balancing or positioning springs to take up slack and stabilize the movement of pistons 52 and 54 with respect to each other as they rotate actuating arm 50. Pistons 52 and 54, which constitute the power-assist servo, are preferably so constructed that the effective area of the inside surface of piston 52 is twice the effective area of the inside surface of piston 54, so that if both pistons are subjected to the same pressure, the force on piston 52 will be double that on piston 54.

It can therefore be seen that the position of spool 130 is determined solely by the pressure in chamber 123 acting on piston 120 against spring 128. In addition, the axial position of land 166 on the spool with respect to piston 52 solely controls the position of that piston, so that the position of piston 52 and hence the displacement setting of the motor is under the sole control of the pressure in chamber 123 acting through piston 120 against spring 128.

The position of piston 52 is controlled in the following manner. When the pressure in chamber 123 is insufficient to overcome the force of spring 128 and when system pressure is zero or at a minimum value, springs 128, 176, and 150 will maintain the motor in the zero displacement position, in which position actuating arm 50 will be pivoted slightly in the clockwise direction from the position shown in FIGURE 4. When system pressure starts increasing, such as when the main control valve of the drive system is actuated to start the vehicle in motion, if the pressure in cylinder 123 is still not sufficient to overcome spring 128, the system pressure acting in groove 158 will serve to more forcefully hold the motor in a zero displacement position. The motor will not be stroked to a positive displacement position until the pressure in chamber 123 is high enough to overcome spring 128, at which time spool 130 will be moved to the left to a positive displacement position such as illustrated in FIGURE 4. In arriving at this position, land 166 will have moved to the left with respect to groove 152 in piston 52 so that system pressure will have been introduced through the groove and passageway 154 into chamber 156. This system pressure will have forced piston 52 to the left to the position illustrated, at which position movement will have stopped because groove 152 will have moved into registry with land 66 to prevent the further flow of system fluid into chamber 156. Piston 54 will have been moved to the right to the position illustrated against the force of system pressure in bore 158 by virtue of the fact that the effective area thereof is in the order of one-half the effective area of piston 52. If a greater pressure is supplied to chamber 123, spool 130 and hence piston 52 will move still further to the left to further increase displacement of the motor. Mechanical stop means are provided in the motor for preventing the rotation of the tilt box therein beyond the maximum displacement position thereof. If, on the other hand, the pressure in chamber 123 is reduced, spool 130 and hence piston 52 will move to the right to decrease the displacement of the motor. As can be seen, therefore, the main power for moving actuating arm 50 is derived from the application of system pressure upon the end faces of pistons 52 and 54; however, such application is under the sole control of control unit 60 which may operate at substantially different pressures.

*Operation*

For purposes of explanation, the system is illustrated in FIGURE 4 in a normal operating condition wherein torque is being applied to the wheel driven by motor 28 and wherein there is a normal weight load on that wheel. Going back to the manner in which the system reached the illustrated condition, it will be assumed for purposes of discussion that the vehicle is in a normally loaded condition and on a relatively level surface on which normal traction may be easily maintained, such as a road or the like. When the vehicle is at a complete at-rest position with the main variable displacement pump thereof stroked to a zero position, the illustrated circuitry will assume a position wherein spool 130 and hence piston 52 are in their rightmost positions thus putting the motor in a zero displacement position, and sensing pistons 20 and 22 will be in their uppermost positions within their respective housings due solely to the weight of the vehicle.

The vehicle is brought into motion by suitably actuating the main control valve to stroke the variable displacement pump to start increasing system pressure, which will initially be hydraulically blocked through the motors since they are in their zero displacement positions. However, such system pressure will be present in passageways 76 and 94 which will be in full communication with passageways 74 and 90, and hence sensing chambers 64 and 82, when the pistons are fully raised. As this pressure increases in the sensing chambers, it will force pistons 22 and 20 downwardly against the upward reactive forces thereon caused by the weight upon the wheel. As the pistons move downwardly, passageways 74 and 90 will be gradually moved out of communication with system pressure passageways 76 and 94 until the pistons reach a stabilized floating or dynamic equilibrium condition in which the pressure drops across the tops of lands 72 and 88 are such that the pressures in the two sensing chambers equal the upwardly directed weight forces on the pistons. In this position the pistons will more or less hover in a dynamic state.

The system fluid which must flow across lands 72 and 88 in order to create the pressure balancing which positions the pistons in the sensing chamber is removed from the system by constructing the lands so that it will leak across the lower edges thereof to the tank. Although the lands are illustrated diagrammatically as being smaller than the passageways they control, in actual practice they will probably be very slightly larger than the passageways so as to minimize the flow of fluid from the system. Each of the sensing piston valves is simply a transducer for converting force exerted against the piston into pressures. It is fully analogous to a closed hydraulic system comprising a piston and cylinder wherein a force on the piston will be directly represented by the pressure within the cylinder. As is well known, closed hydraulic systems are not practical since it is impossible to completely eliminate leakage, and therefore a dynamic system such as that illustrated must be used. In each of the valves shown the force in the sensing chamber is determined solely by the mechanical force exerted upwardly against the piston; the greater the force upward, the greater will be the pressure in the sensing chamber, since the valve is always attempting to seek or reseek its original equilibrium position.

The cross-sectional area of piston 120 and the force of spring 128 are so designed that when the system reaches the condition just described, spool 130 will be moved a slight distance to the left to stroke the pump to a small displacement position, in the order of 20% of its maximum displacement for an average loaded vehicle on level ground and no torque being applied. Since the motor is now in a positive displacement position, the presence of supply fluid under pressure in line 44 will apply a torque to the motor, which torque for purposes of description will be assumed to be in such a direction that its reactive forces are applied upwardly against piston 20 and downwardly against piston 22. The upward movement of piston 20 caused by this initial torque will cause passageway 90 to communicate to a greater degree with system pressure in passageway 94, and the downward force on piston 22 will cause passageway 74 to communicate to a lesser degree with system pressure in passageway 76, which positions are illustrated. Accordingly, since the valve will try to reseek its original position, the pressure in sensing chamber 82 will increase, and this will bias shuttle valve 104 to the position illustrated and provide a greater pressure in chamber 123. The increase in pressure in chamber 123 will cause the spool 130 to move further to the left and thus further increase displacement of the motor which will in turn increase the torque delivered by the motor to the wheel, whereupon the vehicle will accelerate.

Acceleration will take place while the system pressure is increasing to full operating pressure and will continue with the motor in a maximum displacement and hence maximum torque position until the fully delivery of the supply pump is being consumed by all the motors. At this point, the torque on the wheel will begin to decrease and thus reduce the upward force on piston 20. This will in turn increase the pressure drop across land 88 and hence reduce the pressure in chamber 123, whereupon the displacement of the motor will start decreasing. Since system pressure is at full operating level, decreasing the displacement of the motor will increase the speed multiplication thereof and the vehicle will continue to increase in speed, although at a lesser torque. The motor will continue to stroke back to lower displacement positions in this manner until maximum speed is reached. FIGURE 4 might be considered as illustrating the system in this condition, wherein the motor is stroked to a relatively small displacement position.

Hydraulic braking may be achieved by stroking the pump to a zero displacement position and allowing the motors to act as pumps to dump system fluid across a high pressure variable relief valve, thus when braking takes place the torque immediately exerted on a motor is transmitted to the opposite sensing piston, thus increasing the pressure therein, whereupon shuttle valve 104 will shift to the right to put the new torque receiving piston in communication with chamber 123 so that motor displacement may be controlled thereby, in exactly the same manner as for acceleration.

Under all operating conditions, whether driving or braking, the maximum pressure which may be developed in chamber 123 is a function of the weight supported by the wheel, and therefore the maximum displacement and hence torque position of the motor will be reduced when the weight supported by the wheel decreases. This reduces to a minimum the possibility of slippage occurring between the wheel and the ground.

If, at any time while the vehicle is accelerating, cruising or decelerating, a wheel encounters a surface so slippery that spinning starts to develop, the following will occur. The torque being applied to drive or brake the wheel will begin to decrease as the wheel starts to slip and hence the upward force on the torque sensing piston will also decrease. This in turn will cause it to move downwardly to decrease the pressure in its sensing chamber which will in turn decrease the pressure in chamber 123 and reduce the stroke of the motor. If the slippery area has such a low coefficient of friction that there will be no torque influence on the sensing piston, it will be restored to its original condition wherein the pressure in the sensing chamber just equals or balances the weight of the vehicle, with the pump motor stroked to its original low positive displacement position. Although some spinning may take place in this hypothetical condition, it will be very slow because of the small displacement and hence low torque position of the motor, and will not rob the remainder of the system of pressure necessary to drive the remaining wheels still having traction. When the wheel again engages a traction surface the fact that the motor is in a minimum positive displacement position due to the weight will allow for the application of torque thereto, whereupon the sensing piston will sense this torque and stroke the motor to a greater displacement position, and so on in the normal operating manner.

If, at any time while the vehicle is operating, a wheel encounters a depression in the ground such that it loses contact therewith because of the rigid nature of the suspension, such loss of weight will cause both pistons 20 and 22 to move to their lowermost positions, wherein chamber 123 will be immediately communicated with the tank, which in turn will cause spool 130 and hence piston 52 to move to the maximum right-hand position in which the motor displacement is zero. With the motor at zero displacement, the flow of system fluid therethrough is impossible, so that system pressure will not be dissipated, and yet the motor may freewheel. In other words, when the system senses a complete loss of weight, spinning under power is impossible. When the wheel again engages the ground, pistons 20 and 22 will again be forced upwardly into the normal operating range, and the apparatus will then operate in the manner described.

As can be seen, the present system senses the actual torque and/or weight loads on the wheels driven by the respective motors. The sensing means does not respond to motor inlet pressure or motor speed, but, as can be seen, senses the actual load forces existing between the driven means and the vehicle frame.

Although the present system is illustrated utilizing system pressure to activate the sensing pistons, in order to reduce the number of lines communicating with each motor and control assembly, such is not essential and any pressure may be utilized as long as it is great enough to urge and hold the pistons in a lowered position against the weight of the vehicle for the area of the sensing chambers used. It makes no difference whether this pressure is constant or variable.

It will be apparent that insofar as the primary control of the motor displacement in the present system relies on a direct sensing of the torque exerted on or by the wheel (as distinguished from prior systems in which displacement is varied with hydraulic system pressure), the present system is more resistant to uncontrolled spinning even neglecting the modulating effect of the weight sensing feature. Accordingly, for some purposes, as, for example, where the weight carried by one wheel is unlikely to vary greatly, the weight sensing feature may be omitted by journaling the wheel and motor assembly on a fixed trunnion mounted on the vehicle frame coaxially of the wheel. In that case, if a wheel starts to spin, the reduction in torque due to the difference between static and sliding friction will reduce the displacement of the motor and tend to prevent creation of a run-away spin condition. In such an arrangement, it will be necessary to provide a fixed mechanical stop to prevent adjustment of the motor to a zero displacement condition, since otherwise it could not start. Similarly, the weight control feature of the present invention may be used to modulate or limit the effect of a motor displacement control system of the prior art type in which the motor displacement is adjusted in response to system pressure. In this case, the position of spool 130 will be determined by the independently applied influence of weight and system pressure and the wheel and motor assembly will be mounted with its axis intersecting that of piston 22 so that piston will be free of torque influence, and the other piston and cylinder housing 16 will be omitted.

What is claimed is:

1. A hydrostatic drive system including a driven fluid pump, a plurality of variable positive displacement fluid motors powered thereby, a plurality of means individually driven by said motors, control means for varying the displacement of at least one of said motors, sensing means in operative association with said one of said motors for sensing independently of speed and inlet pressure the actual load thereon and means responsive to said sensing means for automatically modifying the action of said control means to control the displacement of said one motor.

2. A hydrostatic drive system including a driven fluid pump, a plurality of variable positive displacement fluid motors powered thereby, a plurality of means individually driven by said motors, control means for varying the displacement of said one of said motors, sensing means in operative association with at least one of said motors for sensing independently of speed and inlet pressure the actual torque load thereon, and means responsive to said sensing means for automatically modifying the action of said control means to increase the displacement of said one motor as the torque load thereon increases and vice versa.

3. A hydrostatic drive system including a driven fluid pump, a plurality of variable displacement fluid motors powered thereby, a plurality of means individually rotationally driven by said motors, control means for varying the displacement of one of said motors, sensing means in operative association with said one of said motors for sensing the load forces acting on the means driven thereby substantially in a plane including the rotational axis of said driven means, and means responsive to said sensing means for automatically modifying the action of said control means to reduce the amount of torque which may be applied to the driven means by said one motor as the load forces thereon decrease and vice versa.

4. A hydrostatic drive system including a driven fluid pump, a plurality of variable positive displacement fluid motors powered thereby, a plurality of means individually rotationally driven by said motors, control means for varying the displacement of at least one of said motors, sensing means in operative association with said one of said motors for sensing the load forces acting on the means driven thereby substantially in a plane including rotational axis of said driven means independently of the inlet pressure to said one motor, and means responsive to said sensing means for automatically modifying the action of said control means to reduce the amount of torque which may be applied to the driven means by said one motor as the load forces thereon decrease and vice versa.

5. A hydrostatic drive system including a driven fluid pump, a plurality of variable positive displacement fluid motors powered thereby, a plurality of means individually rotationally driven by said motors, control means for varying the displacement of at least one of said motors, sensing means in operative association with said one of said motors for sensing the load forces acting on the means driven thereby substantially in a plane including the rotational axis of said driven means and the torque load on said one motor, and means responsive to said sensing means for automatically modifying the action of said control means to reduce the displacement of said one motor as said load forces and torque load decrease and vice versa.

6. A hydrostatic drive system including a driven fluid pump, a plurality of variable positive displacement fluid motors powered thereby, a plurality of means individually rotationally driven by said motors, control means for varying the displacement of at least one of said motors, sensing means in operative association with said one of said motors for sensing the load forces acting on the means driven thereby substantially in a plane including the rotational axis of said driven means and the torque load on said one motor independently of the inlet pressure thereto, and means responsive to said sensing means for automatically modifying the action of said control means to reduce the displacement of said one motor as said load forces and torque load decrease and vice versa.

7. A hydrostatic vehicle drive system including a driven fluid pump, a plurality of variable positive displacement fluid motors powered thereby, a plurality of ground-engaging wheels individually driven by said motors, control means for varying the displacement of at least one of said motors, sensing means in operative association with said one of said motors for sensing the actual torque load thereon independently of the inlet pressure thereto, and means responsive to said sensing means for automatically modifying the action of said control means to increase the displacement of said one motor as the torque load thereon increases and vice versa.

8. A hydrostatic vehicle drive system including a driven fluid pump, a plurality of variable positive displacement fluid motors powered thereby, a plurality of ground-engaging wheels individually driven by said motors, control means for varying the displacement of at least one of said motors, sensing means in operative association with said one of said motors for sensing the weight forces exerted on the wheel driven thereby, and means responsive to said sensing means for automatically modifying the action of said control means to reduce the amount of torque which may be applied to said one wheel by said one motor as the weight forces thereon decrease and vice versa.

9. A hydrostatic vehicle drive system including a driven fluid pump, a plurality of variable positive displacement fluid motors powered thereby, a plurality of ground-engaging wheels individually driven by said motors, control means for varying the displacement of at least one of said motors, sensing means in operative association with said one of said motors for sensing the weight forces exerted on the wheel driven thereby independently of the inlet pressure to said one motor, and means responsive to said sensing means for automatically modifying the action of said control means to reduce the amount of torque which may be applied to said one wheel by said one motor as the weight forces thereon decrease and vice versa.

10. A hydrostatic vehicle drive system including a driven fluid pump, a plurality of variable positive displacement fluid motors powered thereby, a plurality of ground-engaging wheels individually driven by said motors, control means for varying the displacement of at least one of said motors, sensing means in operative association with said one of said motors for sensing the weight forces exerted on the wheel driven thereby and the torque load thereon, and means responsive to said sensing means for automatically modifying the action of said control means to reduce the displacement of said one motor as said weight forces and torque load decrease and vice versa.

11. A hydrostatic drive system including a driven fluid pump, a plurality of variable positive displacement fluid motors powered thereby, a plurality of means individually driven by said motors, control means for varying the displacement of at least one of said motors, sensing means including a fluid cylinder having a cylinder bore therein and a force-sensing piston positioned in said bore, means on one of said piston or cylinder for mounting said one fluid motor whereby said sensing means will sense the actual load thereon, and means responsive to said sensing means for modifying the action of said control means to control the displacement of said one motor.

12. A hydrostatic drive system including a driven fluid pump, a plurality of variable positive displacement fluid motors powered thereby, a plurality of means individually driven by said motors, control means for varying the displacement of at least one of said motors, sensing means including a fixed fluid cylinder having a cylinder bore therein and a force-sensing piston positioned in said bore, means on said piston for mounting said one fluid motor whereby said sensing means will sense the actual torque load thereon, and means responsive to said sensing means for modifying the action of said control means to increase the displacement of said one motor as the torque load thereon increases and vice versa.

13. A hydrostatic drive system including a driven fluid pump, a plurality of variable positive displacement fluid motors powered thereby, a plurality of means individually rotationally driven by said motors, control means for varying the displacement of at least one of said motors, sensing means including a fixed fluid cylinder having a cylinder bore therein and a force-sensing piston positioned in said bore, means on said piston for mounting said one fluid motor whereby said sensing means will sense the actual load forces exerted on the driven means driven thereby in a direction transverse to the rotational axis thereof, and means responsive to said sensing means for modifying the action of said control means to increase the displacement of said one motor as the load forces thereon increase and vice versa.

14. A hydrostatic vehicle drive system including a driven fluid pump, a plurality of variable positive displacement fluid motors powered thereby, a plurality of ground-engaging wheels individually driven by said motors, control means for varying the displacement of at least one of said motors, sensing means including a fixed fluid cylinder having a cylinder bore therein and a force-sensing piston positioned in said bore, means on said piston for mounting said one fluid motor whereby said sensing means will sense the actual torque load thereon, and means responsive to said sensing means for modifying the action of said control means to increase the displacement of said one motor as the torque load thereon increases and vice versa.

15. A hydrostatic vehicle drive system including a driven fluid pump, a plurality of variable positive displacement fluid motors powered thereby, a plurality of ground-engaging wheels individually driven by said motors, control means for varying the displacement of at least one of said motors, sensing means including a fixed fluid cylinder having a cylinder bore therein and a force-sensing piston positioned in said bore, means on said piston for mounting said one fluid motor whereby said sensing means will sense the actual weight load exerted on the wheel driven thereby, and means responsive to said sensing means for modifying the action of said control means to increase the displacement of said one motor as the weight load on the wheel driven thereby increases and vice versa.

16. A hydrostatic drive system including a driven fluid pump, a plurality of variable positive displacement rotary fluid motors powered thereby, a plurality of means individually driven by said motors, control means for varying the displacement of at least one of said motors, sensing means including a pair of fixed fluid cylinders each having a cylinder bore therein and a force-sensing piston positioned in said bore, said cylinders being positioned on opposite sides of the rotational axis of said one motor and equally spaced therefrom, means on said pistons for mounting said one fluid motor whereby said sensing means will sense the actual load thereon, and means responsive to said sensing means for modifying the action of said control means to control the displacement of said one motor.

17. A hydrostatic vehicle drive system including a driven fluid pump, a plurality of variable positive displacement rotary fluid motors powered thereby, a plurality of ground-engaging wheels individually driven by said motors, control means for varying the displacement of at least one of said motors, sensing means including a pair of fixed fluid cylinders each having a cylinder bore therein and a force-sensing piston positioned in said bore, said cylinders being positioned on opposite sides of the rotational axis of said one motor and equally spaced therefrom, means on said pistons for mounting said one fluid motor whereby said sensing means will sense the actual weight and torque load on the wheel driven thereby, and means responsive to said sensing means for modifying the action of said control means to increase the displacement of said one motor as said weight and torque load increases and vice versa.

18. A hydrostatic drive system including a driven fluid pump, a fluid reservoir, a plurality of variable positive displacement fluid motors powered by said pump, a plurality of means individually driven by said motors, control means for varying the displacement of at least one of said motors, sensing means including a fixed fluid cylinder having a cylinder bore therein and a force-sensing piston slidably positioned in said bore, means on said piston for mounting said one motor, valve means operating between said bore and said piston and communicating with a source of fluid under pressure and said reservoir, said valve means operating in response to movement of said piston in said bore for supplying increasing amounts of fluid under pressure to said bore and decreasing amounts to said reservoir as said piston is urged into said bore by increasing loads on said one motor and decreasing amounts of fluid under pressure to said bore and increasing amounts to said reservoir as said piston moves out of said bore, whereby the fluid pressure in said bore varies in proportion to the forces urging said piston thereinto, and means responsive to the pressure in said bore for modifying the action of said control means to control the displacement of said one motor.

19. A hydrostatic vehicle drive system including a driven fluid pump, a fluid reservoir, a plurality of variable positive displacement fluid motors powered by said pump, a plurality of ground-engaging wheels individually driven by said motors, control means for varying the displacement of at least one of said motors, sensing means including a fluid cylinder fixed to the vehicle frame and having a cylinder bore therein and a force-sensing piston slidably positioned in said bore, means on said piston for mounting said one motor whereby torque and weight loads on the wheel driven by said one motor will urge said piston into said bore, valve means operating between said bore and said piston and communicating with a source of fluid under pressure and said reservoir, said valve means operating in response to movement of said piston in said bore for supplying increasing amounts of fluid under pressure to said bore and decreasing amounts to said reservoir as said piston is urged into said bore and decreasing amounts of fluid under pressure to said bore and increasing amounts to said reservoir as said piston moves out of said bore, whereby the fluid pressure in said bore varies in proportion to said torque and weight loads, and means responsive to the pressure in said bore for modifying the action of said control means to increase the displacement of said one motor as said loads increase and vice versa.

20. A hydrostatic vehicle drive system including a driven fluid pump, a fluid reservoir, a plurality of variable positive displacement rotary fluid motors powered by said pump, a plurality of ground-engaging wheels individually driven by said motors, control means for varying the displacement of at least one of said motors, sensing means including a pair of fluid cylinders fixed to the vehicle frame each having a cylinder bore therein and a force-sensing piston slidably positioned in said bore, said cylinders being positioned on opposite sides of the rotational axis of said one motor and equally distant therefrom, means on said pistons for mounting said one motor whereby torque and weight loads on the wheel driven by said one motor will urge at least one of said pistons into one of said bores, valve means operating between said one bore and the piston therein and communicating with a source of fluid under pressure and said reservoir, said valve means operating in response to movement of said one piston in said one bore for supplying increasing amounts of fluid under pressure to said one bore and decreasing amounts to said reservoir as said one piston is urged into said one bore and decreasing amounts of fluid under pressure to said one bore and increasing amounts to said reservoir as said one piston moves out of said one bore, whereby the fluid pressure in said one bore varies in proportion to said torque and weight loads, and means responsive to the pressure in said one bore for modifying the action of said control means to increase the displacement of said one motor as said loads increase and vice versa.

21. A system as claimed in claim 20 wherein a shuttle valve is provided between each of said bores and said last-mentioned responsive means, said shuttle valve being operative to place said responsive means in fluid communication with the one of said bores having the greatest fluid pressure therein.

22. A hydrostatic drive system for a vehicle, including: a driven fluid pump; a plurality of variable positive displacement fluid motors powered thereby; a plurality of driving wheels individually driven by said motors; and anti-skid control means for individually controlling the displacement and hence torque output of each of said motors including sensing means in operative association with each of said motors for sensing the actual load thereon independently of the load on each of the other motors, and means responsive to each of said sensing means for automatically modifying the action of the associated control means to control the displacement of the associated motor to decrease the torque output thereof as the load thereon decreases.

23. A hydrostatic vehicle drive system including a driven fluid pump, a plurality of variable positive displacement fluid motors powered thereby, a plurality of ground engaging wheels individually driven by said motors, control means for varying the displacement of each of said motors, means for mounting each of said motors and the wheel driven thereby to the vehicle including sensing means for sensing the actual load forces exerted on said motor between it and the vehicle, and means responsive to said sensing means for automatically modifying the action of said control means to control displacement of said motor.

References Cited by the Examiner

UNITED STATES PATENTS

| | | | |
|---|---|---|---|
| 887,888 | 5/08 | Wolf | 180—85 |
| 1,099,238 | 6/14 | Day | 91—75 |
| 2,004,215 | 6/35 | Peterson | 180—57 |
| 2,161,439 | 6/39 | Thoma | 60—53 |
| 2,518,578 | 8/50 | Tomlinson | 60—53 |
| 2,598,538 | 5/52 | Haynes | 180—66 X |
| 2,679,300 | 5/54 | Nubling | 180—66 |
| 2,768,636 | 10/56 | Postel et al. | 60—53 X |
| 2,895,744 | 7/59 | Jackson | 280—124 |

FOREIGN PATENTS 576,420   4/46   Great Britain.

A. HARRY LEVY, *Primary Examiner.*
PHILIP ARNOLD, *Examiner.*

UNITED STATES PATENT OFFICE
CERTIFICATE OF CORRECTION

Patent No. 3,177,964　　　　　　　　　　　　　　April 13, 1965

Arthur F. Anderson

It is hereby certified that error appears in the above numbered patent requiring correction and that the said Letters Patent should read as corrected below.

Column 7, line 25, for "its" read -- it --; column 8, line 29, for "overcame" read -- overcome --; line 34, for "postion" read -- position --; column 10, line 17, for "fully" read -- full --; column 12, line 20, after "of", first occurrence, insert -- at least --.

Signed and sealed this 24th day of August 1965.

(SEAL)
Attest:

ERNEST W. SWIDER
Attesting Officer

EDWARD J. BRENNER
Commissioner of Patents